United States Patent [19]
Aoki et al.

[11] Patent Number: 5,734,348
[45] Date of Patent: Mar. 31, 1998

[54] SURVEYING SYSTEM USING GPS

[75] Inventors: Shigeru Aoki; Hiroshi Kishimoto; Yuichi Igarashi, all of Yokohama; Hisaharu Nishii, Kawasaki, all of Japan

[73] Assignee: Nikon Corporation, Tokyo, Japan

[21] Appl. No.: 705,626

[22] Filed: Aug. 30, 1996

[30] Foreign Application Priority Data

Aug. 31, 1995 [JP] Japan ............................. 7-223253
Sep. 18, 1995 [JP] Japan ............................. 7-237963

[51] Int. Cl.$^6$ ............................................. G01S 5/02
[52] U.S. Cl. ............................................. 342/357; 342/352
[58] Field of Search ............................ 342/352, 357, 342/58; 364/445, 443

[56] References Cited

U.S. PATENT DOCUMENTS

| | | | |
|---|---|---|---|
| 5,077,557 | 12/1991 | Ingensand | 342/352 |
| 5,233,357 | 8/1993 | Ingensand et al. | 342/352 |
| 5,379,045 | 1/1995 | Gilbert et al. | 342/357 |
| 5,471,218 | 11/1995 | Talbot et al. | 342/357 |
| 5,477,228 | 12/1995 | Tiwari et al. | |
| 5,502,641 | 3/1996 | Isomura | 364/449 |
| 5,512,905 | 4/1996 | Nichols et al. | 342/357 |
| 5,519,403 | 5/1996 | Bickley et al. | |
| 5,519,620 | 5/1996 | Talbot et al. | |
| 5,612,864 | 3/1997 | Henderson | 364/167.01 |

FOREIGN PATENT DOCUMENTS 4-151509  5/1992  Japan.
4-151510  5/1992  Japan.

Primary Examiner—Thomas H. Tarcza
Assistant Examiner—Dao L. Phan
Attorney, Agent, or Firm—Cushman, Darby & Cushman IP Group of Pillsbury Madison & Sutro LLP

[57] ABSTRACT

A survey system is provided having GPS receivers and using a global positioning system. A reference station main body is provided for surveying; and a plurality of GPS survey apparatuses are provided. They include at least a reference station and a measuring station. The reference station main body has a coordinate composite conversion unit which composes a composite coordinate value of a single coordinate system from GPS data input via an input portion and reference station data measured at the reference station main body. An output device outputs the coordinate value composed by the coordinate composite conversion unit.

21 Claims, 16 Drawing Sheets

SURVEYING SYSTEM USING GPS

BACKGROUND OF THE INVENTION

1. Related Application Data

This disclosure is related to Japanese patent applications 7/237963, filed on Sep. 18, 1995 and 7/223253, filed on Aug. 31, 1995. The content of each of these references is hereby incorporated by reference herein in its entirety.

2. Field of the Invention

This invention relates to a surveying system which uses a global positioning system.

3. Description of Background Information

Conventional survey apparatuses are described in published Japanese patent applications H04-151509 and H04-151510.

FIG. 1 is the block diagram of a conventional survey apparatus. The illustrated conventional survey apparatus includes survey apparatuses including a reference station survey apparatus 210 and a measuring station survey apparatus 220, a personal computer (PC) 230 and a total station 200. Reference station survey apparatus 210 and measuring station survey apparatus 220 each comprise GPS receivers which form part of a general GPS system.

The personal computer (PC) 230 inputs GPS data measured by each of reference station survey apparatus 210 and measuring station survey apparatus 220 and further inputs total station data measured by total station 200. Then, personal computer 230 converts the data into a data of a single coordinate system using a coordinate conversion program.

There are several issues concerning the illustrated conventional survey apparatus. The personal computer 230 is typically installed in an office, and thus the quality of the survey results cannot be checked at the survey location. For example, if a determination is made that the quality is poor after returning to the office with the survey results, the surveyor must return to the survey location and again perform a survey.

In addition, if a compact portable personal computer 230 is brought to the survey location, the surveyor is still burdened with carrying extra equipment. Even when the portable personal computer 230 is brought to the survey location, the GPS data and the reference station data must be inputted into the personal computer 230 to check the survey quality. Moreover, reference coordinate data and an absolute directional angle must be entered into the computer.

SUMMARY OF THE INVENTION

An object of the present invention, therefore, is to provide a survey system where the survey results are determined and used immediately at the survey location, while the survey results are checked.

Another object of the present invention to save time for entering data at the survey location without increasing the equipment that must be brought to the survey location.

A further object of the present invention is to provide a system that uses the survey results of the GPS survey apparatus for inputting a reference coordinate value and the absolute directional angle of the reference station by connecting the reference station to the GPS survey apparatus.

Another object of the present invention is to provide GPS survey apparatus which can be used independent of and removed from the reference station.

Another object of the present invention is to make the reference station compact and to reduce cost by processing a baseline within the GPS survey apparatuses.

In order to accomplish one or more of the above objects, a total station may be provided which includes an I/O, a coordinate composite device, and an output device. The I/O receives GPS data input from GPS survey apparatuses on the reference station side and on the measuring station side. The GPS data may comprise GPS values measured by the reference station and measuring station GPS survey apparatuses, and those GPS data may be processed with the baseline to produce a GPS coordinate value of a WGS-84 (world geodetic system, 1984). The coordinate composite device composes a coordinate value of a single coordinate system from the GPS coordinate value input from the I/O and the total station data measured by the total station. The output outputs the coordinate value which was composed by the coordinate composite converter. The output may comprise an output unit including, for example, a display such as a liquid crystal display, and an external communicator for external output of data.

The total station main body is detachably connected with a GPS survey apparatus, either to the reference station side or to the measuring station side. The GPS survey apparatus on the reference station side may include a baseline processor. This baseline processor converts the respective GPS values measured by the GPS survey apparatuses, on the reference station side and on the measuring station side, into a GPS coordinate value in accordance with the WGS-84 system.

According to a further aspect of the present invention, the total station main body and the GPS survey apparatuses may separately collect data on the reference station side and on the measuring station side. The collected GPS data is sent to the I/O of the total station main body. Then, the coordinate composite conversion device composes a coordinate value in accordance with a single coordinate system from total station data and the GPS data input via the I/O. The total station main body then outputs the composed coordinate value via the output unit.

The reference station and measuring station GPS survey apparatuses can each be connected to the total station main body by a connector. After the GPS survey apparatuses each measure their data including respective GPS values, the GPS value is transmitted from the measuring station GPS survey apparatus to the reference station GPS survey apparatus. The GPS coordinate value is then determined by a baseline processor provided in the reference station GPS survey apparatus using the GPS value obtained from both the measuring station and the reference station GPS survey apparatuses. Then, the GPS coordinate value is sent from the reference station GPS survey apparatus to the I/O of the total station main body.

In accordance with an alternate aspect of the present invention, the reference station GPS survey apparatus may be provided with a baseline processor and a GPS coordinate converter. The baseline processor converts GPS values measured by the GPS survey apparatuses both on the reference station side and on the measuring station side into a GPS coordinate value in accordance with the WGS-84 system. The GPS coordinate converter converts the GPS coordinate value into a GPS survey coordinate value of the survey system. The GPS coordinate value of the WGS-84 system is converted to a GPS survey coordinate value of another system, for example, a geodetic system, a bessel system or a local system.

The GPS coordinate value converted by the baseline processor may be further converted into a GPS survey coordinate value by the GPS coordinate converter of the reference station GPS survey apparatus and then sent to the I/O of the total station main body.

In accordance with a further aspect of the present invention, a total station main body may be provided which has a measuring unit, a digital process unit, and a total station (TS) coordinate converter. The reference station GPS survey apparatus includes a receiver, an input unit, a coordinate composite converter, an output unit, and a power source unit. According to this aspect of the invention, the GPS value measured by the reference station, the GPS value measured by the measuring station GPS survey apparatus, and the total station data output from the total station main body are together utilized by the input unit of the reference station GPS survey apparatus.

Next, the baseline processor of the reference station GPS survey apparatus processes its own GPS value which was input from the input unit together with the GPS value it receives from the measuring station GPS survey apparatus with the baseline processor provided as part of the reference station GPS survey apparatus. The reference station GPS survey apparatus outputs the GPS coordinate value in accordance with the WGS-84 system. Thereafter, the coordinate composite converter, which forms part of the reference station GPS survey apparatus composes the value of a single coordinate system such as a geodetic system, utilizing the GPS coordinate value output from the baseline processor and also utilizing the total station data input via the input unit.

The total station value which was measured by the total station is input to the total station coordinate converter of the total station, and is converted to the total station coordinate value of the Japanese geodetic system. The total station coordinate value is sent to the input unit of the reference station GPS survey apparatus.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts throughout the several views, and wherein.

DETAILED DESCRIPTION OF THE EXEMPLARY EMBODIMENTS

1. First Embodiment

1.1 Survey System

Figure 1:
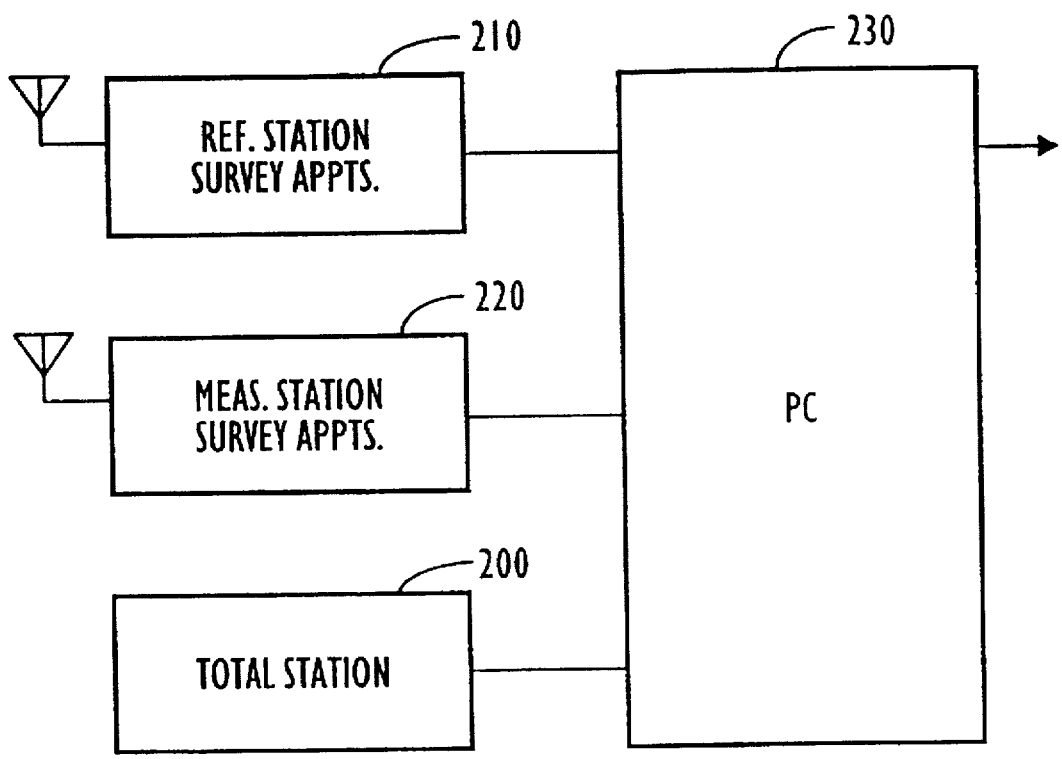
FIG. 1 is a block diagram of a conventional survey apparatus.
Figure 2:
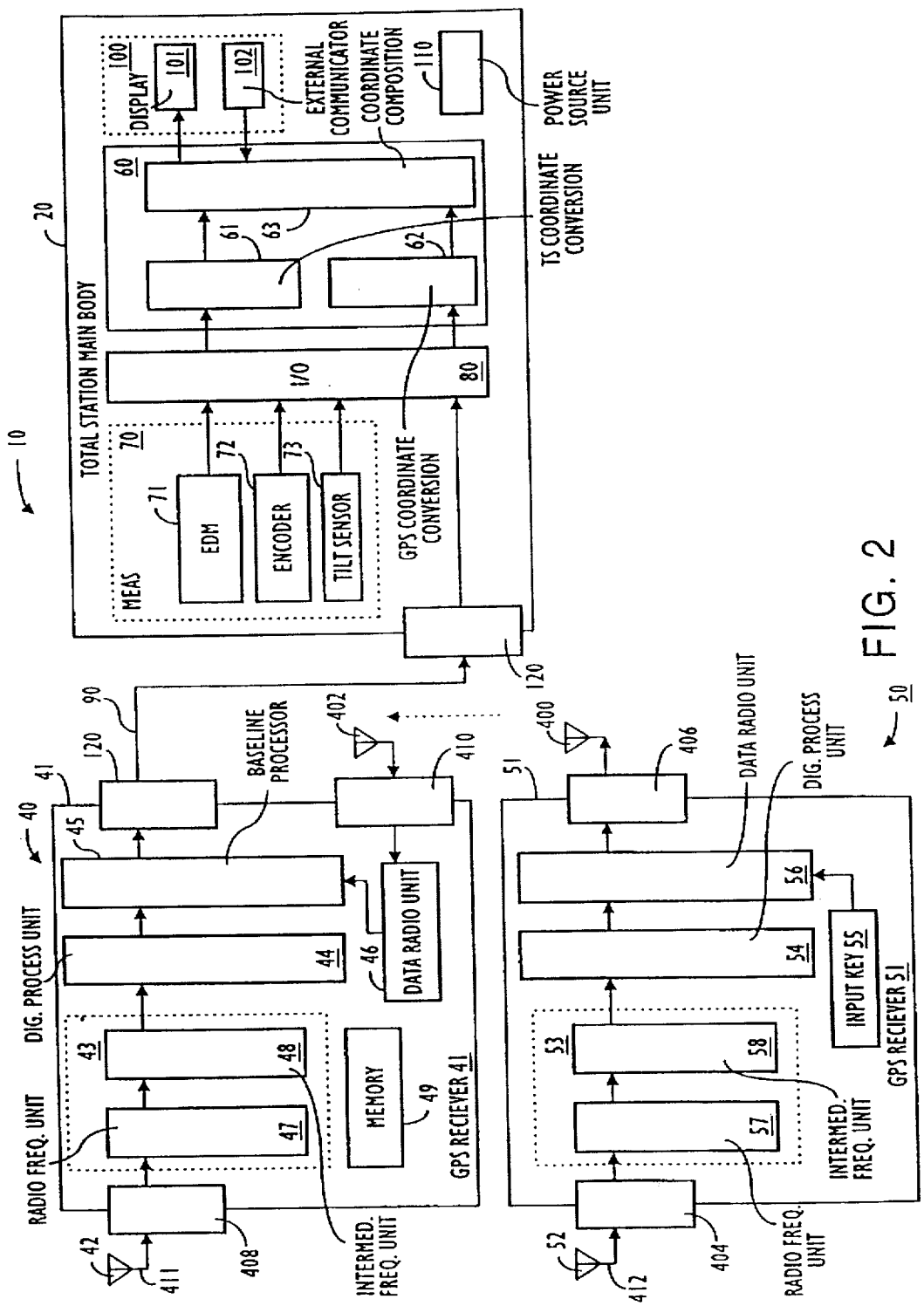
FIG. 2 is a block diagram of the survey system in accordance with a first embodiment of the present invention.

Referring now to the drawings in greater detail, FIG. 2 shows a first embodiment of a survey system generally indicated at 10. The illustrated survey 10 includes a total station (TS) and a plurality of GPS survey apparatuses for use as part of a general GPS system. The GPS survey apparatuses include a reference station GPS survey apparatus 40 and a measuring station GPS survey apparatus 50. As an alternative embodiment, several GPS survey apparatuses may be provided which serve as measuring station GPS survey apparatuses, and several GPS survey apparatuses may be provided which serve as reference station GPS survey apparatuses. The total station includes a total station main body 20 and a pole (not shown in FIG. 2).

1.2 Total Station Main Body

Figure 14:
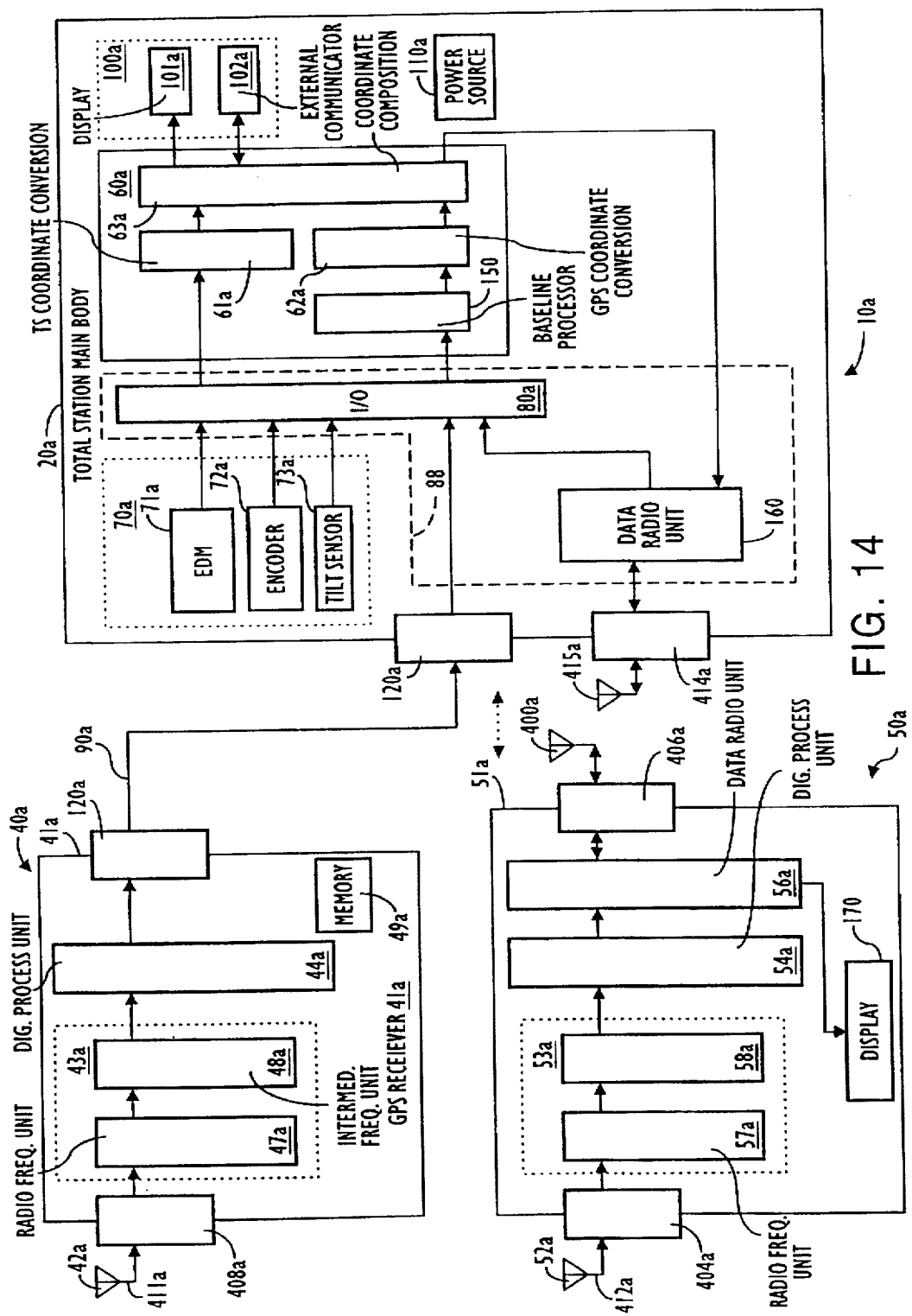
FIG. 14 is a block diagram of a survey system according to a second embodiment of the present invention.

In the total station main body 20, a measuring device 70 is provided which is connected to an input side of a coordinate composite converter 60, through an I/O 80. The measuring device 70 has a EDM 70 (Electric Distance Meter), an encoder 72, and a tilt sensor 73. The I/O 80 inputs the GPS data by digital data communication. Digital data communication may be provided either directly by the use of a cable, as shown in FIG. 2, or through the use of a wireless communication link, e.g., as shown in FIG. 14. A conductor cable or a light communication cable, e.g., a fiberoptic link 90, may be used as a communication cable. Wireless communication may be accomplished by RF communications, infrared communication, or any other conventional wireless communication technique.

As shown in FIG. 2, coordinate composite converter 60 comprises an TS coordinate converter 61, a GPS coordinate converter 62, and a coordinate composition device 63 as functional structures. TS coordinate converter 61 converts values measured by measurement device 70 into TS coordinate values (longitude $\phi$, latitude $\psi$, height h) of a Japanese geodetic system, bessel system, or local system. The GPS coordinate converter 62 converts the GPS coordinate values, which include three dimensional rectangular coordinates (dx, dy, dz) and a variance $\lambda$, of the WGS-84 system sent from reference station GPS survey apparatus 40, into the same coordinate system as the TS coordinate value. Coordinate composition device 63 composes the GPS survey coordinate value of the Japanese geodetic system, bessel system or local system, from the TS coordinate value sent from TS coordinate converter device 61 and the GPS survey coordinate value sent from GPS coordinate converter 62.

Figure 3:
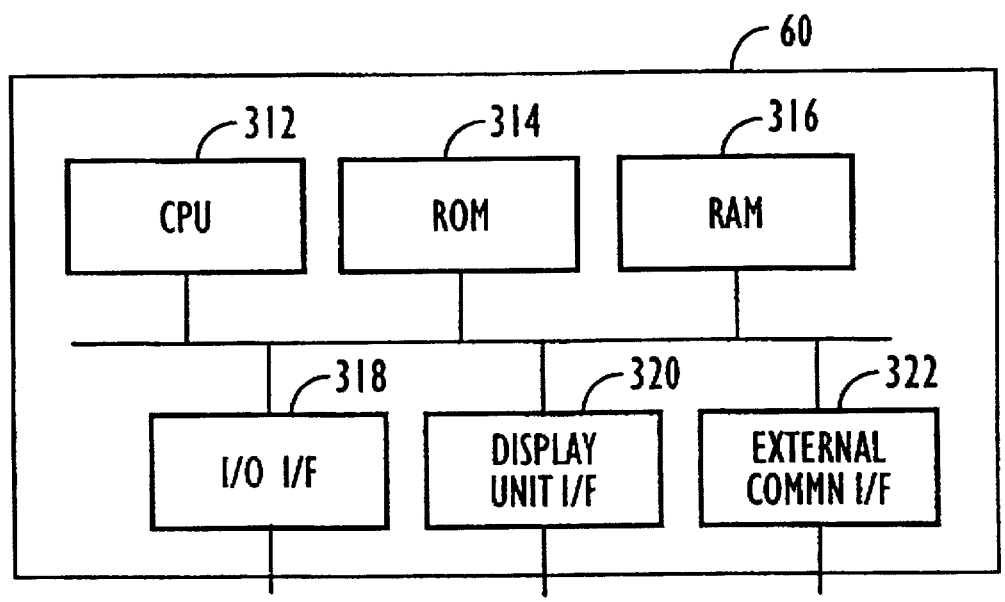
FIG. 3 is a hardware block diagram of a coordinate composite conversion device.

FIG. 3 shows a hardware structure of a coordinate composite converter 60. A CPU 312 is provided which uses a RAM 316 as a data storage memory, and operating in accordance with a program stored in a ROM 314 (and/or in accordance with a program stored in RAM 316), works as the coordinate composite converter 60. Coordinate composite converter 60 includes an I/O interface 318, a display interface 320, and an external communication interface 322, which operate as interfaces for the I/O 80, the display 101, and external communication unit 102, respectively.

An output unit 100 is connected to the output side of coordinate composite converter 60. This output unit 100 outputs the coordinate value composed by the coordinate composite converter 60. Output unit 100 includes a display unit 101, which comprises, e.g., a liquid crystal display or a 7-segment LED display, and an external communication unit 102. A recording medium, such as an IC card, FD (floppy disk) or MD (magnetic disk) can be used as the external communication unit 102. External communication unit 102 may also include an interface for providing connection to peripheral devices or for facilitating wireless communication with other devices.

Figure 7:
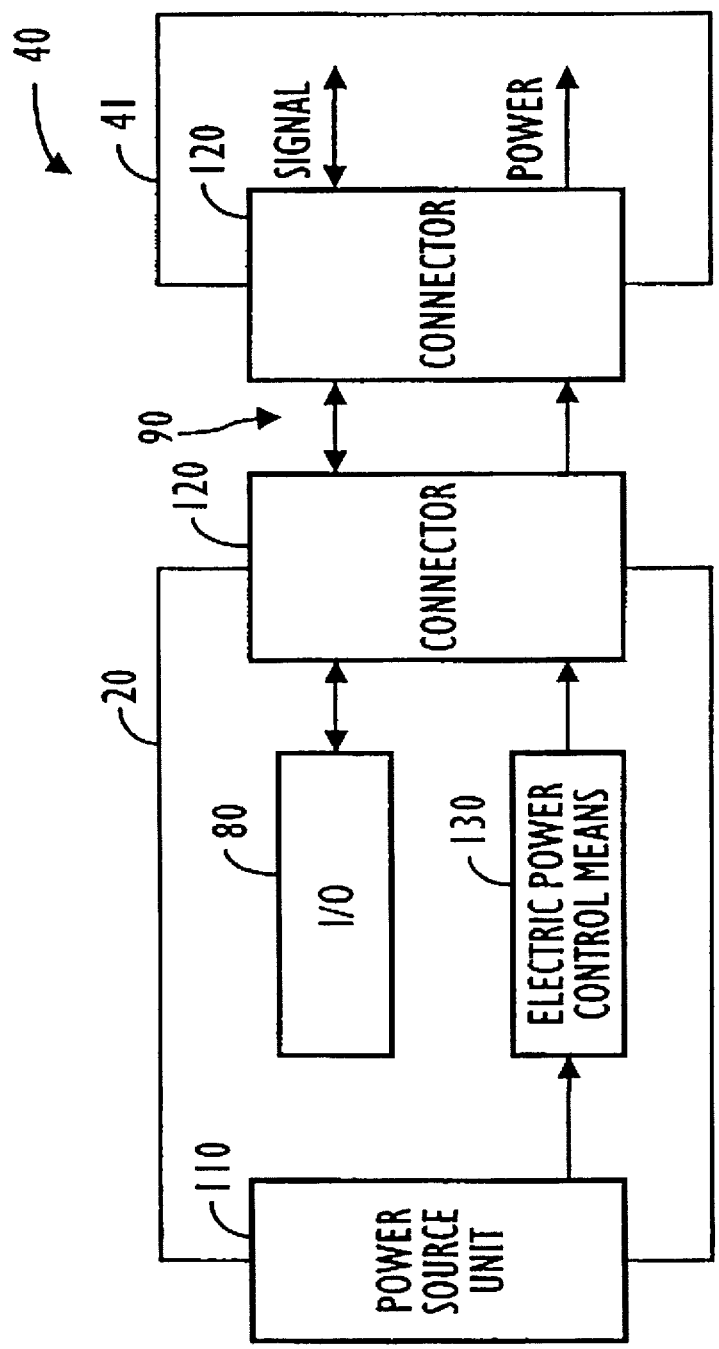
FIG. 7 is a block diagram of a reference station GPS survey apparatus and a total station together with a detachable connector.

As shown in FIG. 7, total station main body 20 may be further provided with a power source 110, such as a battery, which it shares with reference station GPS survey apparatus 40. A plurality of batteries may be provided, one of which being selectively switched to serve as the power source. Conventionally, the reference station and the GPS survey apparatuses have separate power source. Alternatively, the power source can be easily housed and easily charged by standardizing the capacity and the size of the power source. However, since the total station and the GPS survey apparatuses have different sizes and different power consumptions, new design is desired to standardize the power sources. In this embodiment, the power source can be housed and easily charged without a new design because one power source is shared as a supply source for both sides.

1.3 GPS Survey Apparatus on the Reference Station Side

As shown in FIG. 2, reference station GPS survey apparatus 40 may be provided with a GPS receiver 41 and a GPS antenna 42. Antenna 42 is connected to GPS receiver 41 through an antenna cable 411 and an antenna interface 408. GPS receiver 41 has a front-end 43, a digital process unit 44, a baseline processor 45, a memory 49, and a data radio unit 46. The front-end 43 has a radio frequency unit 47 and an intermediate frequency unit 48, and receives the data from GPS antenna 42. Digital process unit 44 receives the data from intermediate frequency unit 48 of front-end 43, and converts the data from analog to digital form.

Reference station GPS survey apparatus 40 further includes a connecter 120 coupled to an output of baseline processor 45 and an antenna 402 coupled to data radio unit 46 via an antenna interface 410.

The GPS value obtained on the reference station side is input from digital process unit 44 to baseline processor 45. Another GPS value obtained at the measuring station GPS survey apparatus 50 is radio communicated, via antenna 402, antenna interface 410 and data radio unit 41, to baseline processor 45. Baseline processor 45 processes the GPS values it receives by the baseline process and produces a converted GPS coordinate value in accordance with the WGS-84 system. The converted GPS coordinate value is output to I/O 80 of total station main body 20 through light communication cable 90.

Figure 6:
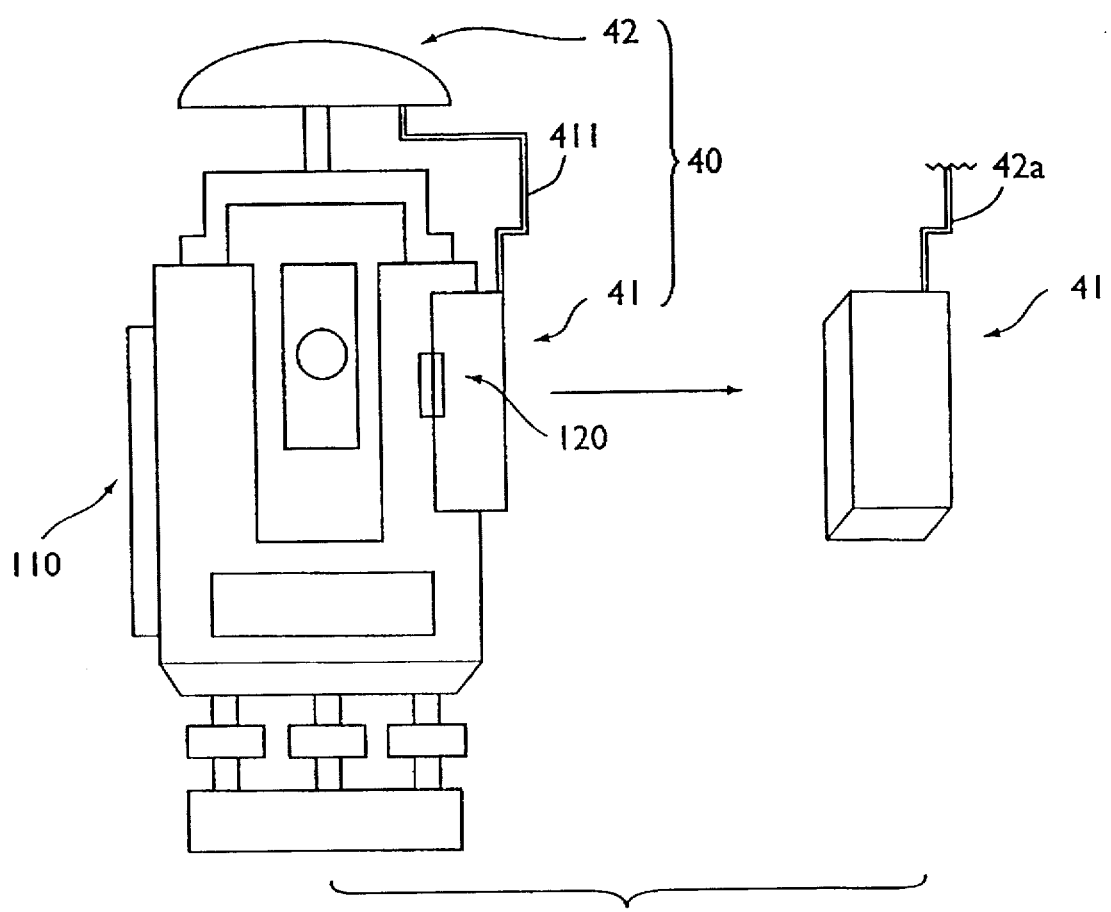
FIG. 6 is an outer view of a total station.

As shown in FIG. 6, in order to facilitate both combined and independent use of a reference station GPS survey apparatus 40, GPS receiver 41 is detachably connected to total station main body 20 through the use of a connector 120. Similarly, to facilitate both combined and independent use of GPS antenna 42, it is also detachably mounted on the top of total station main body 20. In an alternative embodiment, GPS receiver 41 and GPS antenna 42 can each be fixed to total station main body 20.

Figure 4:
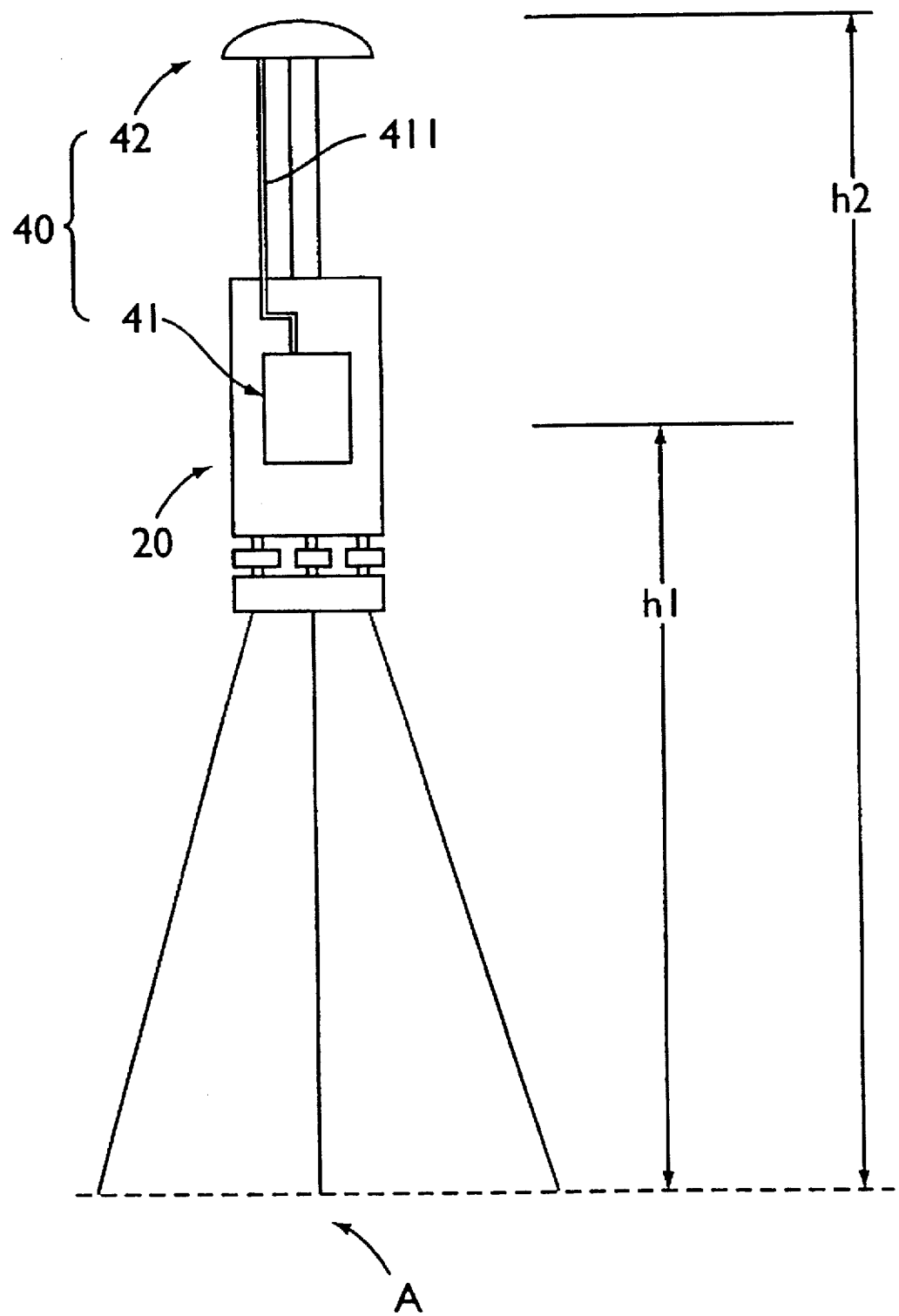
FIG. 4 is a schematic diagram showing an establishment including a total station and a reference station GPS survey apparatus.

FIG. 4 shows a position of GPS antenna 42 in relation to a measuring point "A", where total station main body 20 is installed at measuring point "A". The positions of the center of the total station and of GPS antenna 42 relative to the measuring point "A" are predetermined. In this embodiment, the respective positions of both the total station and GPS antenna 42 are arranged at the same positions along the horizontal x and y axes, while they are offset from each other along the vertical z axis.

Because the positions of the center of the total station main body 20 and of the GPS antenna 42 relative to the measuring point "A" are predetermined, the offset value can be provided in all three directions x, y and z. The height h1 (referred to as a total station height) is the length from the measuring point "A" to the center of the total station main body 20, which is an amount of offset along the z axis. The height h2 (referred to as an antenna height) is the length from the measuring point "A" to the coordinate standard position, where the GPS antenna 42 is set. The coordinate of the point "A", the height h1 and the height h2 are stored in, for example, RAM 316, for subsequent use in the baseline process and the coordinate conversion.

As shown in FIG. 7, the reference station GPS survey apparatus 40 and total station main body 20 each send digital signals such as the converted GPS coordinate value, through connector 120. Total station main body 20 includes, among other elements, an electric power control device 130 which supplies electric power supplied from power source 110 of total station main body 20 to GPS receiver 41 via connector 120.

1.4 GPS Survey Apparatus on the Measuring Station Side

As shown in FIG. 2, the measuring station GPS survey apparatus 50 has a GPS receiver 51 and a GPS antenna 52 connected to GPS receiver 51 through an antenna cable 412 and an antenna interface 404. GPS receiver 51 includes a front-end 53, a digital process unit 54, an input key 55, and a data radio unit 56. Front-end 53 includes a radio frequency unit 57 and a intermediate frequency unit 58, and receives the data from GPS antenna 52. Digital process unit 54 converts the data output from intermediate frequency unit 58 from analog to digital and forwards the digital information to data radio unit 56. Data radio unit 56 sends measurement station information (further defined below) to GPS receiver 41 of the reference station GPS survey apparatus 40 via wireless communication using data radio unit 56, antenna interface 406 and antenna 400.

Figure 5:
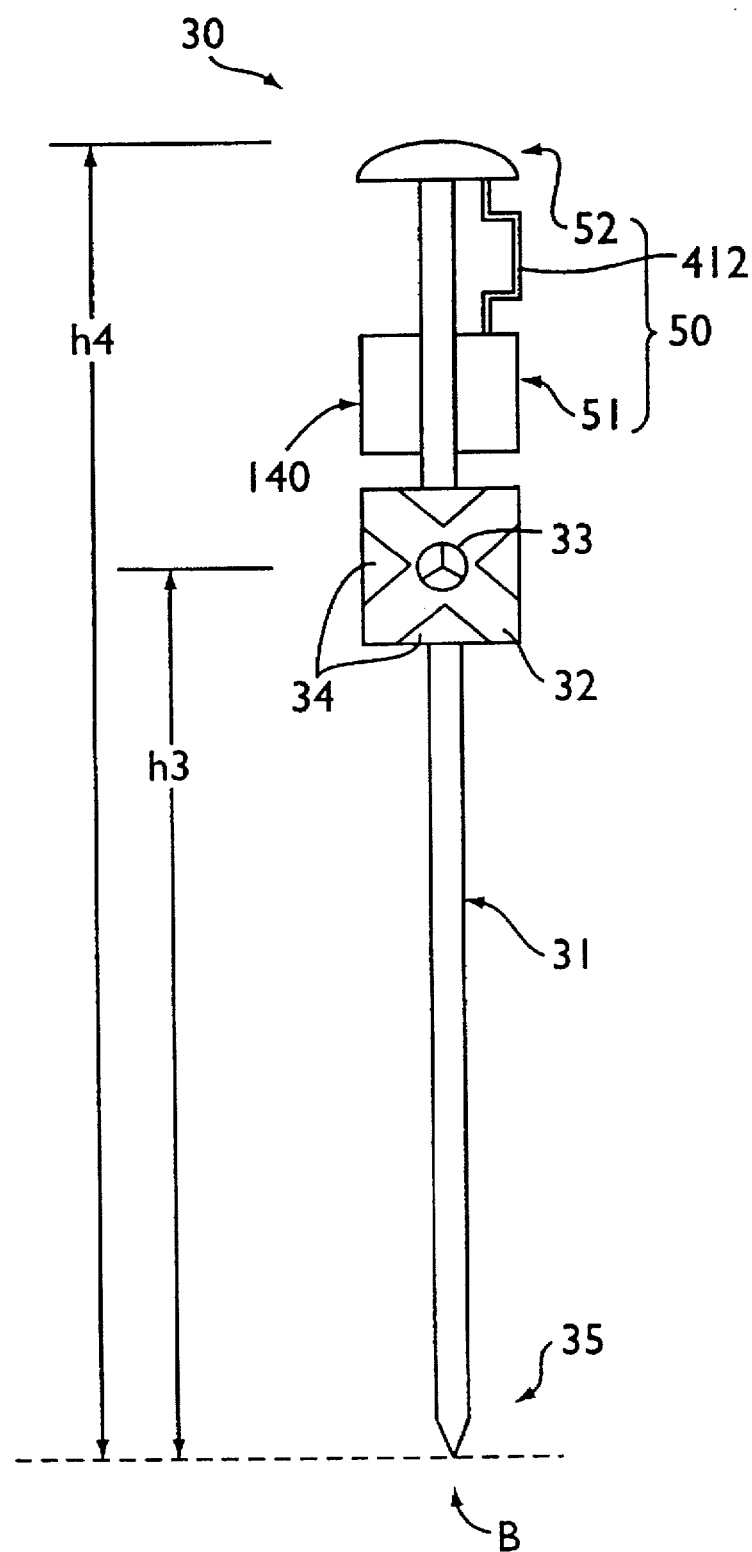
FIG. 5 is a schematic view of a survey pole together with a measuring station GPS survey apparatus.

As shown in FIG. 5, in order to facilitate both combined and independent use, GPS receiver 51 is detachably mounted to pole 31 at a middle height position. In addition, GPS receiver 51 is rotatably mounted to pole 31. Accordingly, when necessary, GPS receiver 51 can be rotated to a position where it is easy to see and control. Furthermore, in order to facilitate independent use, GPS antenna 52 may be detachably mounted on the top of pole 31. However, in the alternative, GPS antenna 52 and GPS receiver 51 can each be fixed on pole 31 so that they cannot be removed.

FIG. 5 generally shows a survey pole 30 as including a pole 31 and a target plate 32. Target plate 32 is fixed to pole 31, such as at the middle thereof, and a distance measuring prism 33 is provided at the center of target plate 32. A survey target 34 is spaced radially from prism 33 and is positioned at the periphery of target plate 32. Pole 31 further includes an end 35. Pole 32 has a height of approximately 2 meters. In order to facilitate easy carrying of the pole, the pole may comprise a plurality of shorter poles or may be retractable or collapsible. As another embodiment, target plate 32 may be fixed at a specified position on pole 31, or may be movable along pole 31.

The relative position of GPS antenna 52 relative to a measuring point "B" where a pole end 35 of pole 31 is placed is predetermined. In this embodiment, the respective positions of the distance measuring prism 33 and GPS antenna 52 are arranged to be the same as the measuring point "B" along the horizontal x and y axes, while they each are provided at a position offset from the measurement point "B" along the vertical axis z. However, as another embodiment, these items may be offset from the measuring point "B" along all three axes x, y and z. A height h3 (referred to as the prism height) from the measuring point "B" to the prism 33, and a height h4 (referred to as the antenna height) from the measuring point "B" to the coordinate standard position of GPS antenna 52 are each set in advance in a memory such as a RAM 316. The relative positions of prism 33 and GPS antenna 52 to measuring point "B" are set in the memory, e.g., RAM 316, in advance and are subsequently used for the baseline process or the coordinate conversion. A prism constant of prism 33 is also stored in advance.

The height h3 of the prism, the height of the antenna h4, and the prism constant are each input from input key 55. The measurement station information sent by data radio unit 56 as noted above includes the GPS value converted by the digital process unit, the height h3, the height h4, and a prism constant.

The height h3 of prism 33, the height h4 of antenna 52, and the prism constant, which are input via input key 55, are sent from GPS receiver 41 of the reference station GPS survey apparatus 40 to the total station main body 20 through light communication cable 90, and are used for the coordinate composition. As shown in FIG. 5, pole 31 also has a power unit 140 which supplies electric power to GPS receiver 51. In this embodiment, GPS survey apparatuses 40 and 50 on the reference station side and on the measuring station side have different structures. However, they may have the same structures so that they may each be used as a GPS survey apparatus on either the reference station side or the measuring station side.

1.5 Main Flow Chart of the Coordinate Conversion

Figure 8:
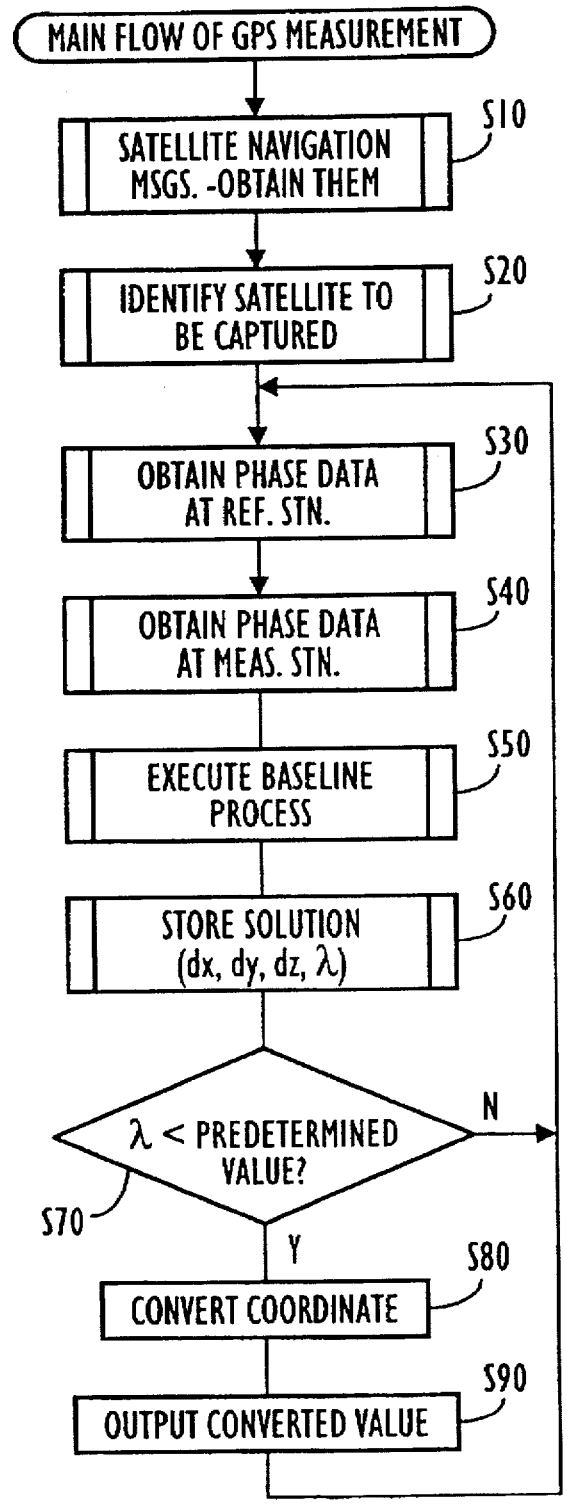
FIG. 8 is a main flow chart of a general signal process.

FIG. 8 is a main flow chart of a GPS measurement of the GPS measurement apparatus. In this embodiment, a kinematic positioning method is introduced for performing relative positioning. In a first step S10, satellite signals are located, and navigation messages are obtained. Then, in step S20, a determination is made as to which satellite is to be captured. In step S30, phase data is obtained from the captured satellite signal by the GPS survey apparatus 40 on the reference station side. The obtained phase data is stored in memory 49 in the reference station GPS survey apparatus 40. Then, in step S40, the phase data of the satellite signal is obtained by the measurement station GPS survey apparatus 50. The phase data is sent by wireless communication from GPS receiver 51 of GPS survey apparatus 50 to GPS receiver 41 of GPS survey apparatus 40, and is stored in memory 49 of GPS receiver 41. In FIG. 8, steps S30 and S40 are executed sequentially. However, the reference and measuring GPS survey apparatuses 40 and 50 may obtain the phase data of the satellite signal concurrently.

Next, in step S50, baseline processor 45 (see FIG. 2) in GPS survey apparatus 40 will execute the baseline process. Here, the baseline processor 45 calculates the GPS coordinate value (dx, dy and dz) and the variance λ of the WGS-89 system based on the phase data of the GPS survey apparatuses 40 and 50, the coordinates of the known measuring point (which were set in advance) and the navigation message of the GPS survey apparatus 40.

In step S60, the solution (dx, dy, dz, and λ) obtained with the baseline process is stored in memory 49 of reference station GPS survey apparatus 40. Then, in step S70, a determination is made as to whether the variance λ is smaller than a predetermined value. If it is smaller than the predetermined value, a determination is made to proceed, and the process proceeds to step S80 where a coordinate conversion is performed on the solution (dx, dy, dz and λ). The coordinate conversion of the solution is accomplished by the GPS coordinate converter 62 of the coordinate composite converter 60. The GPS coordinate value (dx, dy and dz) of the WGS-84 system is sent from the baseline processor 45 of GPS survey apparatus 40 to the GPS coordinate converter 62 via light communication cable 90 and I/O 80.

If the variance λ is greater than or equal to the predetermined value as determined at step S70, the process will return to step S30 in order to again obtain phase data for the GPS survey apparatuses 40 and 50.

1.6 Locating the Satellite Signal and Obtaining the Navigation Message

Figure 9:
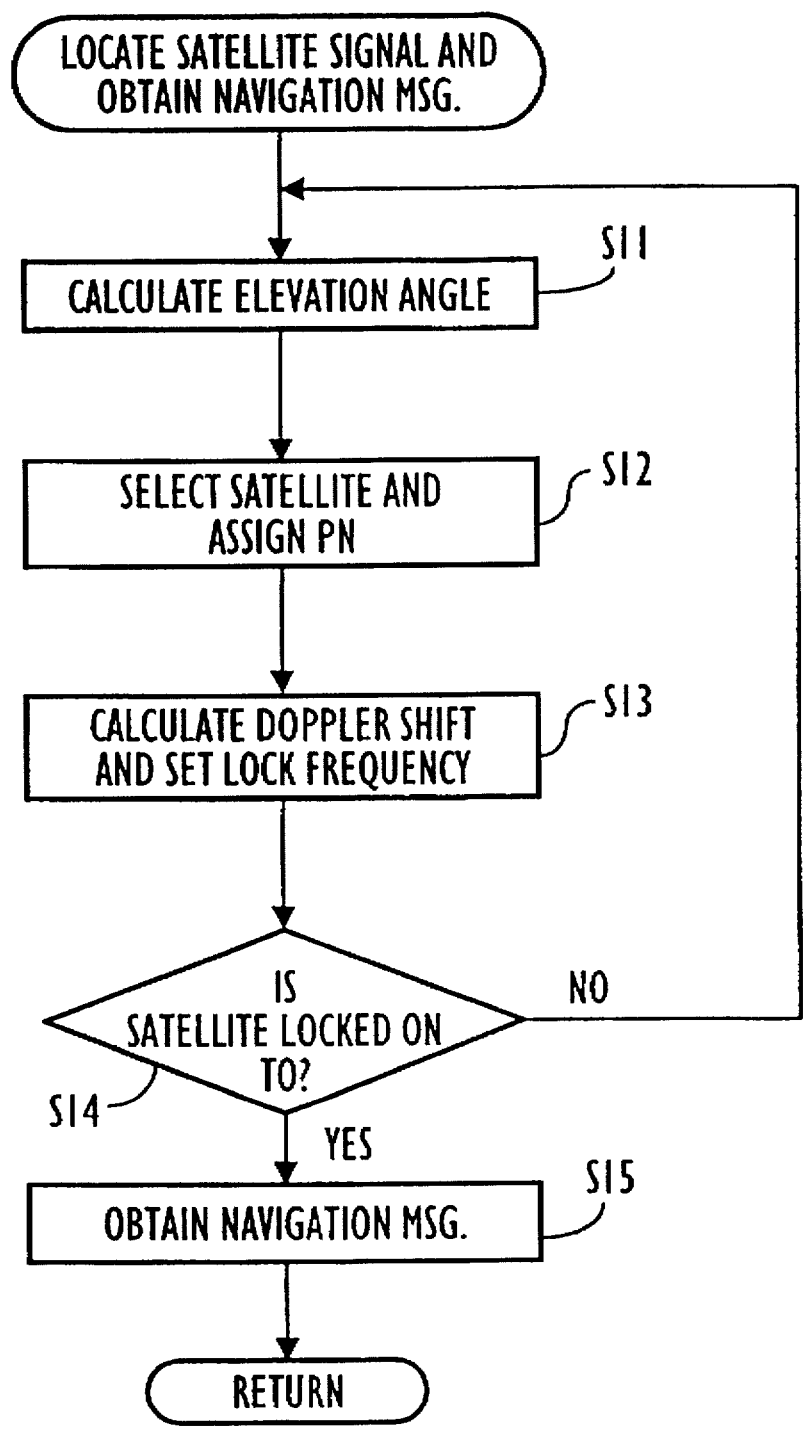
FIG. 9 is a detailed flow chart of a subroutine for locating satellite signals and obtaining navigation messages.

FIG. 9 illustrates in more detail a process for locating a satellite signal and obtaining navigation messages, which corresponds to step S10 of the process illustrated in FIG. 8. GPS coordinate converter 62 converts the GPS coordinate value (dx, dy and dz) into the same system as the TS coordinate value, such as the WGS-84, survey coordinate value of the Japanese geodetic system (longitude φ, latitude ψ, height h), bessel system or the local system. The converted GPS survey coordinate value is output in step S90 of the process shown in FIG. 8, from GPS coordinate converter 62 to coordinate composite device 63. In a first step S11, an elevation angle to the satellite is calculated. Then, in step S12, the satellite is selected and PN (pseudo noise code) is assigned. In step S13, the Doppler shift is calculated and a lock frequency is set. Next, a determination is made in step S14 as to whether the process has captured (i.e., locked onto) the desired satellite. If the satellite has been captured, the process will proceed to step S15, where the navigation message (including information indicating the position of the satellite and time information) is obtained. If the satellite has not been captured, the process will return from step S14 to step S11. The process is repeated until the satellite has been captured.

1.7 Identification of the Captured Satellite

Figure 10:
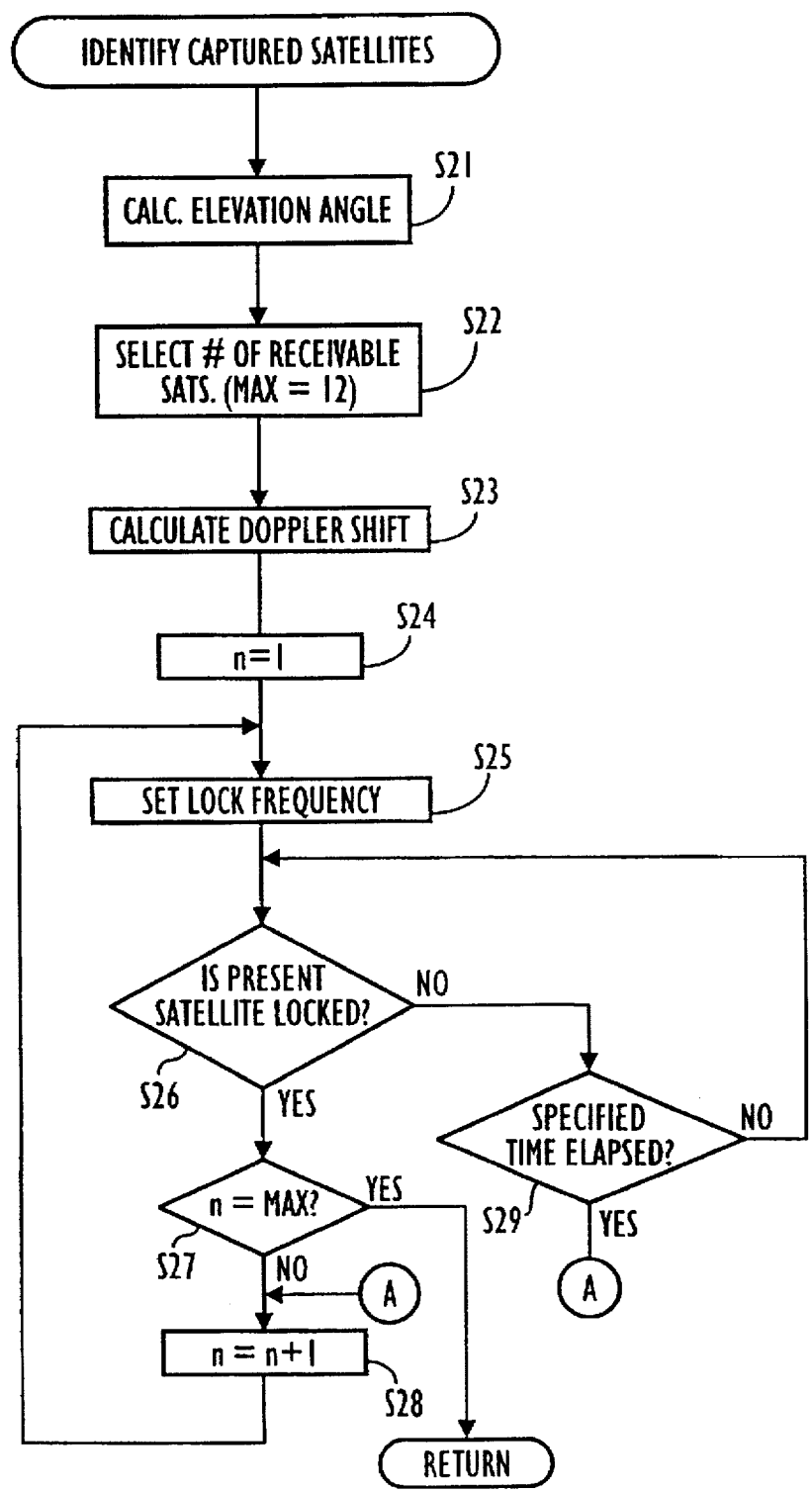
FIG. 10 is a detailed flow chart of a subroutine for identifying a captured satellite.

FIG. 10 shows in more detail the process performed in step S20 in the process illustrated in FIG. 8, whereby the captured satellites are identified. In a first step S21, the elevation angle of the satellite is calculated. Next, in step S22, the number of receivable satellites (MAX) is selected. In the embodiment, MAX is set to 12 (MAX=12), since a 12-channel receiver is used. In step S23, the Doppler shift is calculated. Then, in step S24, the first satellite (n=1) among the receivable satellites is selected, and in step S25, a lock frequency is set to the channel N corresponding to the selected satellite. Next, in step S26, a determination is made as to whether the presently selected nth satellite is locked. If the satellite is locked, the process proceeds to step S27. In step S27, a determination is made as to whether all of the MAX receivable satellites have been selected, that is whether n is equal to MAX (n=MAX).

If as determined in step S27, all of the MAX receivable satellites have not been selected, the process proceeds to step S28, and the number n is incremented (n=n+1). The process then returns to step S25. The value n is incremented at step S28 until all of the 12 receivable satellites are selected, that is until n becomes equal to MAX. Accordingly, if n=MAX is determined at step S27, the process will return.

If a determination is made at step S26 that the present satellite has not yet been captured, the process proceeds from step S26 to step S29, where a determination is made as to whether a specified amount of time has elapsed. If the specified amount of time has not elapsed, the process will return to step S26. If the specified time has elapsed, the process will proceed directly from step S29 to step S28, where the number n is incremented in order to identify a next captured satellite.

Step S29 is provided, since among all of the receivable MAX satellites (MAX=12 in the specified embodiment), some satellites will not be capturable for some reason, e.g., due to trees or buildings. Because of this, the number of satellites "max" which are actually obtained is less than MAX.

Figure 11:
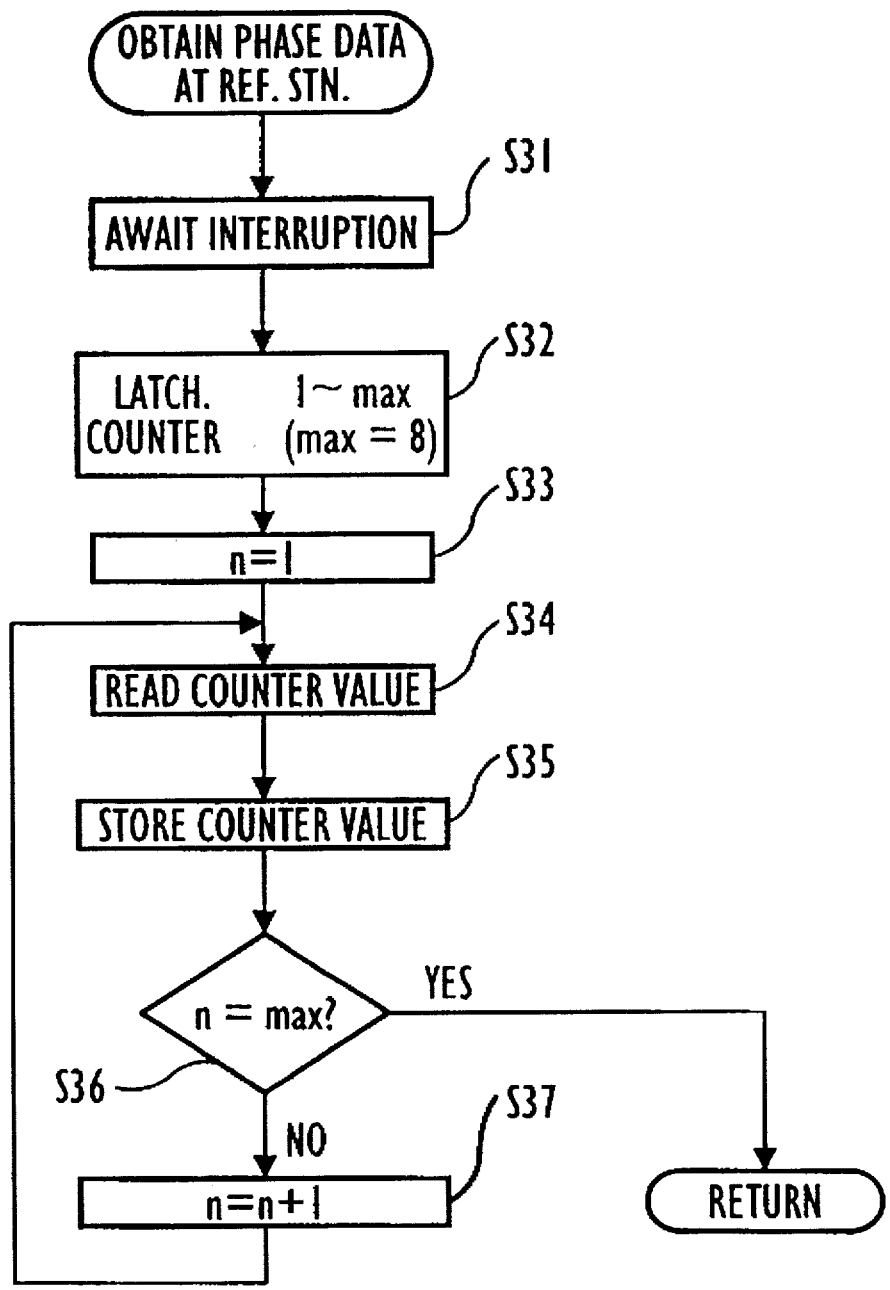
FIG. 11 is a detailed flow chart of a subroutine for obtaining phase data of certain satellite signals from the reference station GPS survey apparatus.

1.8 Obtaining Phase Data of the Satellite Signal at the Reference Station GPS Survey Apparatus FIG. 11 shows in more detail the process corresponding to step S30 in the process illustrated in FIG. 8, whereby phase data of a satellite signal is obtained at the reference station GPS survey apparatus. In a first step S31, the process awaits a timer interruption. This is a process for waiting for the phase data to be accumulated in a counter. For example, the process may wait for 0.5 seconds. Then, in step S32, the process latches the value of the first through the max-th counter. The variable "max" is the number of obtained satellites, which is set in the illustrated embodiment equal to 8.

Next, in step S33, the counter which corresponds to the first satellite is selected (n=1). The GPS receiver 41 of the reference station GPS survey apparatus 40 is provided with at least max (8, in the illustrated embodiment) counters built into the receiver. Accordingly, in step S34, a counter value is read from the counter corresponding to the presently selected satellite. In step S35, the read counter value n is stored in memory 49 of the reference station GPS survey apparatus 40. After storing the value in memory, in step S36, a determination is made as to whether all of the max satellites have been selected, that is, whether n is equal to max. If all of the max satellites have not yet been selected, the process proceeds to step S37, where n is incremented by 1. The process then returns to step S34, and repeats until all of the max satellites have been selected, that is, until n becomes equal to max. When n becomes equal to max, as determined in step S36, the process returns.

Figure 12:
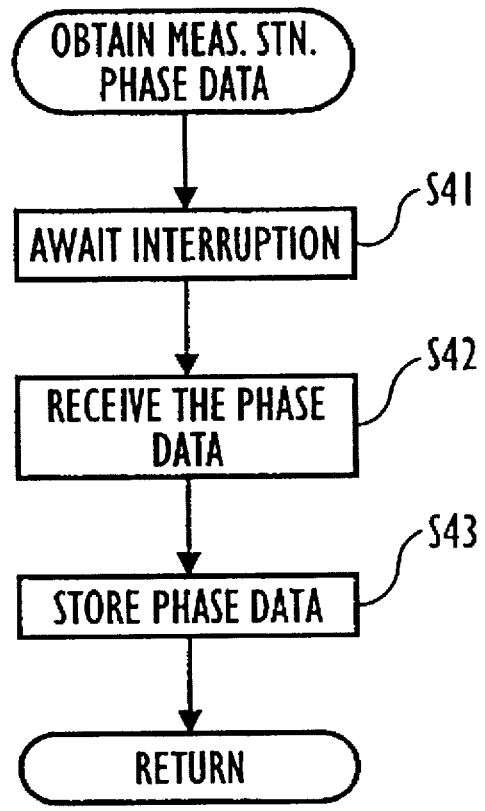
FIG. 12 is a detailed flow chart of a subroutine for obtaining phase data of certain satellite signals from the measuring station GPS survey apparatus.

1.9 Obtaining Phase Data of Satellite Signal at the Measuring Station GPS Survey Apparatus FIG. 12 shows in more detail the process corresponding to step S40 in the process illustrated in FIG. 8. More specifically, the flow chart of FIG. 12 corresponds to a process for obtaining phase data at the measuring station and transmitting that data to the reference station. This illustrated process is executed after the phase data of the satellite signal is obtained by the measuring station GPS survey apparatus 50. The measuring station GPS survey apparatus 50 obtains the phase data of the satellite signal in the same way as such phase data is obtained by the reference station GPS survey apparatus 40, as described in FIG. 11. In step S41, the reference station GPS survey apparatus 40 waits for an interruption of communication between data radio unit 46 of reference station GPS survey apparatus 40. In step S42, the obtained GPS phase data is transmitted by the measuring station GPS survey apparatus 50 and is received by data radio unit 46 of the reference station GPS survey apparatus 40. In step S43, the GPS value which includes phase data obtained by the measuring station GPS survey apparatus 50 is stored in memory 49. The process then returns after step S43.

1.10 Baseline Process

Figure 13:
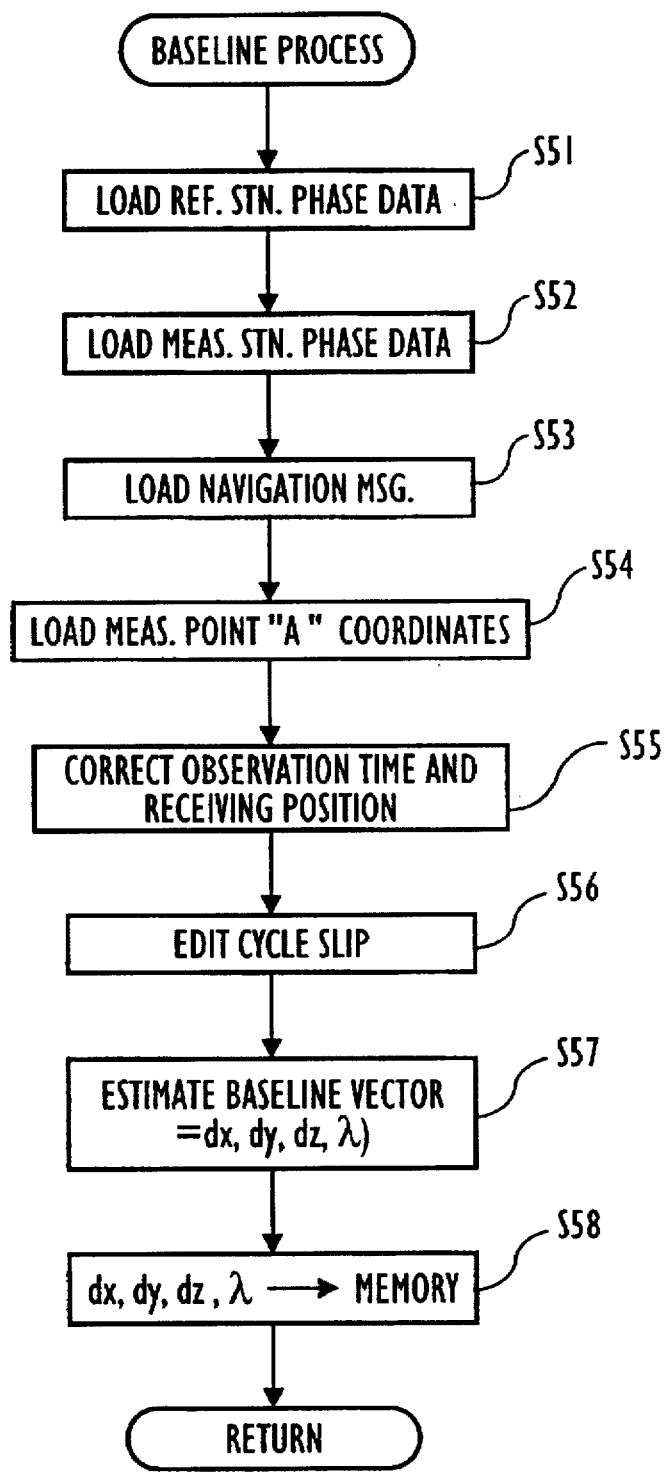
FIG. 13 is a detailed flow chart of a subroutine for performing baseline processing.

FIG. 13 shows a flow chart of a baseline process which corresponds to step S50 in the flow chart shown in FIG. 8. The baseline process of FIG. 13 is performed by baseline processor 45 which forms part of GPS receiver 41 of the reference station GPS survey apparatus 40 shown in FIG. 2. In a first step S51, the phase data of the reference station GPS survey apparatus 40 which is stored in memory 49 is read into the local working area of GPS receiver 41, i.e., it is loaded for use. Next, in step S52, phase data of the measuring station GPS survey apparatus 50, also stored in memory 49, is loaded. In step S53, the navigation message (obtained in step S15 in the process shown in FIG. 9) is loaded. In step S54, the coordinates corresponding to the measurement point "A" are loaded. Steps S51–S54 may be processed in any order.

In step S55, the observation time and the receiving position are corrected in accordance with a pseudo distance. Then, in step S56, a cycle slip is edited. Thereafter, in step S57, as baseline vector is estimated with a double difference, and the three dimensional rectangular coordinate value (dx, dy and dz) and a variance ($\lambda$) are obtained. The baseline vector is then stored in the memory 49 in step S58. After step S58, the baseline process returns.

1.11 Data Collection Procedure

A data collection procedure will now be described. First, a reference station is set at a particular setting point. If the coordinates of the setting point of the reference station are not known, the measuring station GPS survey apparatus 50 is set at a known measuring point "B." The reference station GPS survey apparatus 40 is connected to total station main body 20 via a connector 120.

Using the two GPS survey apparatuses, including the reference station GPS survey apparatus 40 and the measuring station GPS survey apparatus 50, and the coordinates corresponding to the known measuring point "B", the coordinates of the setting point corresponding to the total station main body 20 are determined. In the illustrated embodiment, a GPS survey coordinate value converted by GPS coordinate converter 62 is used for the original coordinates corresponding to the setting point of total station main body 20.

On the other hand, if the coordinates corresponding to the setting point for total station 20 are known, the known coordinates are input to total station 20. The reference station GPS survey apparatus 40 is connected to total station 20 with connector 120, as shown in FIG. 4. At this time, the coordinates of the measuring point corresponding to the reference station GPS survey apparatus 40 are determined based upon (1) the height h2 of antenna 52, which value was input in advance, and (2) the coordinates of the setting point corresponding to total station main body 20, which was also input previously. A coordinate value of the measuring point for reference station GPS survey apparatus 40 can be input independently from total station main body 20.

FIG. 5 shows a measuring station GPS survey apparatus 50 connected to a survey pole 30. The survey pole 30 is set at an unknown measuring point "B". An absolute directional angle of the total station is determined using both the reference station and the measuring station GPS survey apparatuses. In this embodiment, the absolute directional angle of the total station 20 is determined based upon the GPS survey coordinate value converted by GPS coordinate converter 62 in reference station main body 20.

When performing an actual survey, total station main body 20, and both or either one of the GPS survey apparatuses 40 and 50, can be used for performing the survey depending upon the environment of the survey location.

When the GPS antennas 42 and 52 of the GPS survey apparatuses 40 and 50 are blocked by trees or buildings, and when the conditions for receiving the satellite signal are not good, the survey may be accomplished by both total station main body 20 and survey pole 30. When total station main body 20 and both GPS survey apparatuses 40 and 50 are used, accuracy is increased. By introducing the most appropriate coordinate values determined among many determined coordinate values, the survey becomes more accurate and reliable.

Each of the GPS survey apparatuses 40 and 50 can be used independently. That is, the reference station GPS survey apparatus 40 can be removed from the total station main body 20, and the measuring station GPS survey apparatus 50 can be removed from survey pole 30.

2. Second Embodiment

FIG. 14 shows a block diagram of a survey system according to a second embodiment of the present invention. Similar symbols are used for parts similar to those used in the first embodiment. The illustrated survey system 10a generally includes a total station main body 20a, a reference station GPS survey apparatus 40a, and a measuring station GPS survey apparatus 50a.

Total station main body 20a is similar in construction to total station main body 20 illustrated in FIG. 2. More specifically, it includes a measuring device 70a, coupled to a coordinate composite converter 60a via an input portion 88. Coordinate composite converter 60a is connected to an output device 100a. Total station main body 20a is further provided with a power source 110a, a connector 120a, and an antenna 415a connected to input portion 88 via an antenna interface 414a. Input portion 88 includes both an I/O 80a and a data radio unit 160.

Measuring device 70a of the illustrated survey system 10a of FIG. 14 is substantially identical to the measuring device 70 shown in FIG. 2, and includes an EDM (Electric Distance Meter) 71a, an encoder 72a, and a tilt sensor 73a. Coordinate composite converter 60a of FIG. 14 is the same as coordinate composite converter 60 shown in FIG. 2, in that coordinate composite converter 60a includes an TS coordinate converter 61a, a GPS coordinate converter 62a, and a coordinate composition device 63a. However, coordinate composite converter 60a is further provided with a baseline processor 150.

Output device 100a is substantially identical to output device 100 of the embodiment illustrated in FIG. 2. It includes a display 101a and an external communicator 102a.

The signal connection between connector 120a and I/O 80a is similar to the connection between connector 120 and I/O 80 of the embodiment illustrated in FIG. 2. However, a data radio unit 160 is further coupled to I/O 80a within total station main body 20a. Data radio unit 160 together with I/O 80a form an input portion 88. Antenna 415a and antenna interface 414a are each connected to data radio unit 160, and are provided to facilitate transfer of information between the measuring station GPS survey apparatus 50a and total station main body 20a.

Since total station main body 20a is provided with a baseline processor 150, as part of coordinate composite converter 60a, it is not necessary to provide a baseline processor as part of reference station GPS survey apparatus 40a. The illustrated reference station GPS survey apparatus 40a includes a GPS receiver 41a, an antenna 42a, an antenna interface 408a, and a connector 120a. The connector portion 120a of reference station GPS survey apparatus 40a is coupled to the connector portion 120a of total station main body 20a via a light communication cable 90a.

GPS receiver 41a includes a front-end 43a and a digital process unit 44a, which together are substantially identical to front-end 43 and digital process unit 44 which are provided as part of the GPS receiver 41 shown in FIG. 2. Front-end 43a includes a radio frequency unit 47a and an intermediate frequency unit 48a. Digital process unit 44a is connected directly to connector portion 120a. GPS receiver 41a further includes a memory 49a, which serves substantially the same functions as described previously for memory 49 in the embodiment illustrated in FIG. 2. No baseline processor is provided as part of GPS receiver 41a, as that is not necessary in the embodiment illustrated in FIG. 14.

Measuring station GPS survey apparatus 50a is also similar to measuring station GPS survey apparatus 50 in the embodiment illustrated in FIG. 2, except that measuring station GPS survey apparatus 50a is not provided with an input key 55. Rather, it is provided with a display 170. More specifically, measuring station GPS survey apparatus 50a includes a GPS receiver 51a and a GPS antenna 52a connected to GPS receiver 51a through an antenna cable 412a and an antenna interface 404a. An additional antenna 400a is also connected to GPS receiver 51a through an antenna interface 406a. GPS receiver 51a includes a front-end 53a, a digital process unit 54a, a data radio unit 56a, and a display 170. Front-end 53a includes a radio frequency unit 57a and an intermediate frequency unit 58a, and receives data from GPS antenna 52a. Digital process unit 54a converts data output from intermediate frequency unit 58a from analog to digital and forwards the digital information to data radio unit 56a. Data radio unit 56a sends measurement station information (defined in more detail above with respect to the first embodiment) to total station main body 20a via wireless communication using data radio unit 56a, antenna interface 406a and antenna 400a.

By providing baseline processor 150 as part of reference station main body 20a, thus eliminating the need for a baseline processor within reference station GPS survey apparatus 40a, reference station GPS survey apparatus 40a is significantly simplified. Accordingly, its size, weight, and cost can be reduced.

Display 170 is provided as part of measuring station GPS survey apparatus 50a. Data radio unit 56a communicates with data radio unit 160 of reference station main body 20a. The coordinate values composed by coordinate composition device 63a can be communicated to measuring station GPS survey apparatus 50a via the data radio unit, and the results on such data may be displayed via display 170. Display 170 may comprise, for example, a liquid crystal display or a 7-segment LED display. A direct communication link is provided between measuring station GPS survey apparatus 50a and total station main body 20a and a display 170 forms part of measuring station GPS survey apparatus 50a. Therefore, GPS processing may be performed utilizing total station main body 20a based upon data provided, in part, by measuring station GPS survey apparatus 50a in order to determine the precise coordinates of measuring station GPS survey apparatus 50a. Those coordinates may then be displayed, in real time, via display 170 at the survey site.

3. Third Embodiment

Figure 15:
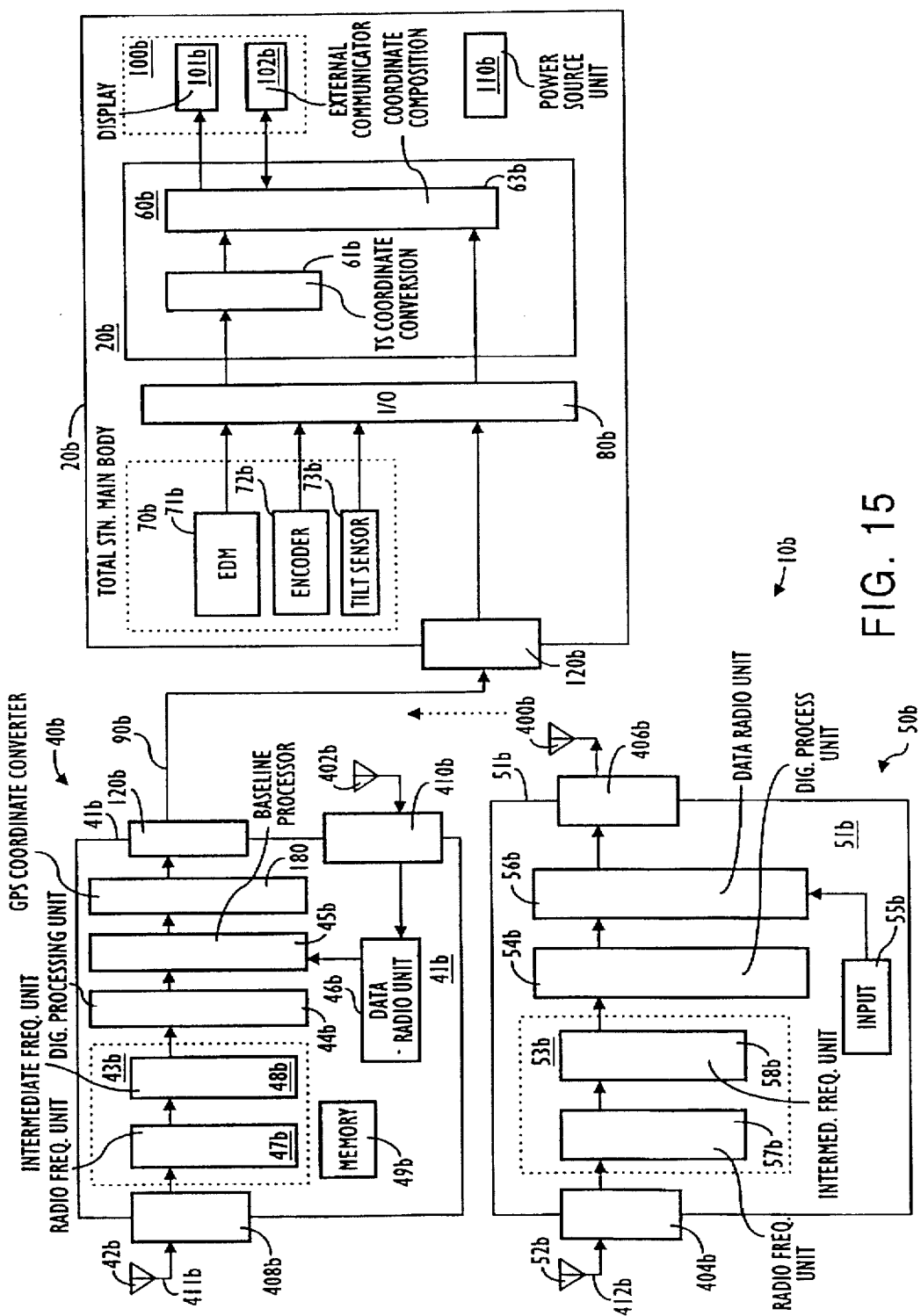
FIG. 15 is a block diagram of a survey system according to a third embodiment of the present invention.

FIG. 15 shows a block diagram of a survey system 10b according to a third embodiment of the present invention. Similar symbols are used for those parts which are similar to parts used in the first embodiment. The illustrated survey system 10b generally includes a total station main body 20b, a reference station GPS survey apparatus 40b, and a measuring station GPS survey apparatus 50b.

Total station main body 20b is similar in construction to total station main body 20a illustrated in FIG. 2. More specifically, it includes a measuring device 70b, coupled to a coordinate composite converter 60b via an input device I/O 80b. Coordinate composite converter 60b is connected to an output device 100b. Total station main body 20b is further provided with a power source 110b and a connector 120b.

Measuring device 70b of the illustrated survey system 10b of FIG. 15 is substantially identical to the measuring device 70 shown in FIG. 2, and includes an EDM (Electric Distance Meter) 71b, an encoder 72b, and a tilt sensor 73b. Coordinate composite converter 60b of FIG. 14 is similar to coordinate composite converter 60 shown in FIG. 2, in that it includes a TS coordinate converter 61b connected to a coordinate composition device 63b. However, coordinate composite converter 60b is lacking a GPS coordinate converter as was provided in the embodiment illustrated in FIG. 2.

Output device 100b is substantially identical to output device 100 of the embodiment illustrated in FIG. 2, and includes a display 101b and an external communicator 102b.

The signal connection between connector 120b and I/O 80b is similar to the connection between connector 120 and I/O 80 of the embodiment illustrated in FIG. 2. More specifically, connector 120b is connected directly to I/O 80b.

A GPS coordinate converter is not provided as part of coordinate composite converter 60b, since a GPS coordinate converter 180 is provided as part of reference station GPS survey apparatus 40b. The illustrated reference station GPS survey apparatus 40b includes a GPS receiver 41b, an antenna 42b, an antenna interface 408b, and a connector 120b. The connector portion 120b of reference station GPS survey apparatus 40b is coupled to a connector portion 120b of total station main body 20b via a light communication cable 90b.

GPS receiver 41b includes a front-end 43b, a digital process unit 44b, and a baseline processor 45b, which are respectively substantially identical to receiver 43, digital process unit 44, and baseline processor 45, which are provided as part of the GPS receiver 41 shown in FIG. 2. Front-end 43b includes a radio frequency unit 47b and an intermediate frequency unit 48b. A digital process unit 44b is connected to baseline processor 45b. GPS receiver 41b further includes a data radio unit 46b, a memory 49b, an antenna interface 410b, and an antenna 402b, each of which is substantially identical to the corresponding parts provided as part of GPS receiver 41 illustrated in FIG. 2.

GPS receiver 41b is further provided with a GPS coordinate converter 180 placed between baseline processor 45b and connector 120b. GPS values obtained by reference station GPS survey apparatus 40b and GPS values obtained by measuring station GPS survey apparatus 51b via antenna 402b, antenna interface 410b, and data radio unit 46b, are processed by baseline processor 45b and then by GPS coordinate converter 180. Baseline processor 45b converts the GPS values obtained from each of the GPS survey apparatuses into GPS coordinates in accordance with the WGS-84 system, and those converted values are then further converted by GPS coordinate converter 180 to produce GPS survey coordinate values in accordance with other systems such as a Japanese geodetic system, a Bessel system, or a local system.

Measuring station GPS survey apparatus 50b is substantially identical to measuring station GPS survey apparatus 50 in the embodiment illustrated in FIG. 2. More specifically, measuring station GPS survey apparatus 50b includes a GPS receiver 51b and a GPS antenna 52b connected to GPS receiver 51b through an antenna cable 412b and an antenna interface 404b. An additional antenna 400b is also connected to GPS receiver 51b through an antenna interface 406b. GPS receiver 51b includes a front-end receiver 53b, a digital process unit 54b, a data radio unit 56b, and an input key 55b.

This front-end 53b includes a radio frequency unit 57b, and an intermediate frequency unit 58b, and receives data from GPS antenna 52b. Digital process unit 54b converts data output from intermediate frequency unit 58b from analog to digital and forwards the digital information to data radio unit 56b. Data radio unit 56b sends measurement station information (defined in more detail above, with respect to the first embodiment) to total station main body 20b, via useless communication to reference station GPS survey apparatus 40b and subsequent communication to total station main body 20b through the use of light communication cable 90b.

In the embodiment illustrated in FIG. 15, the total station main body 20b is significantly simplified by providing GPS coordinate converter 180 as part of reference station GPS survey apparatus 40b and omitting that part from total station main body 20b. Accordingly, the size, weight, and cost of reference station main body 20b can be reduced.

4. Fourth Embodiment

Figure 16:
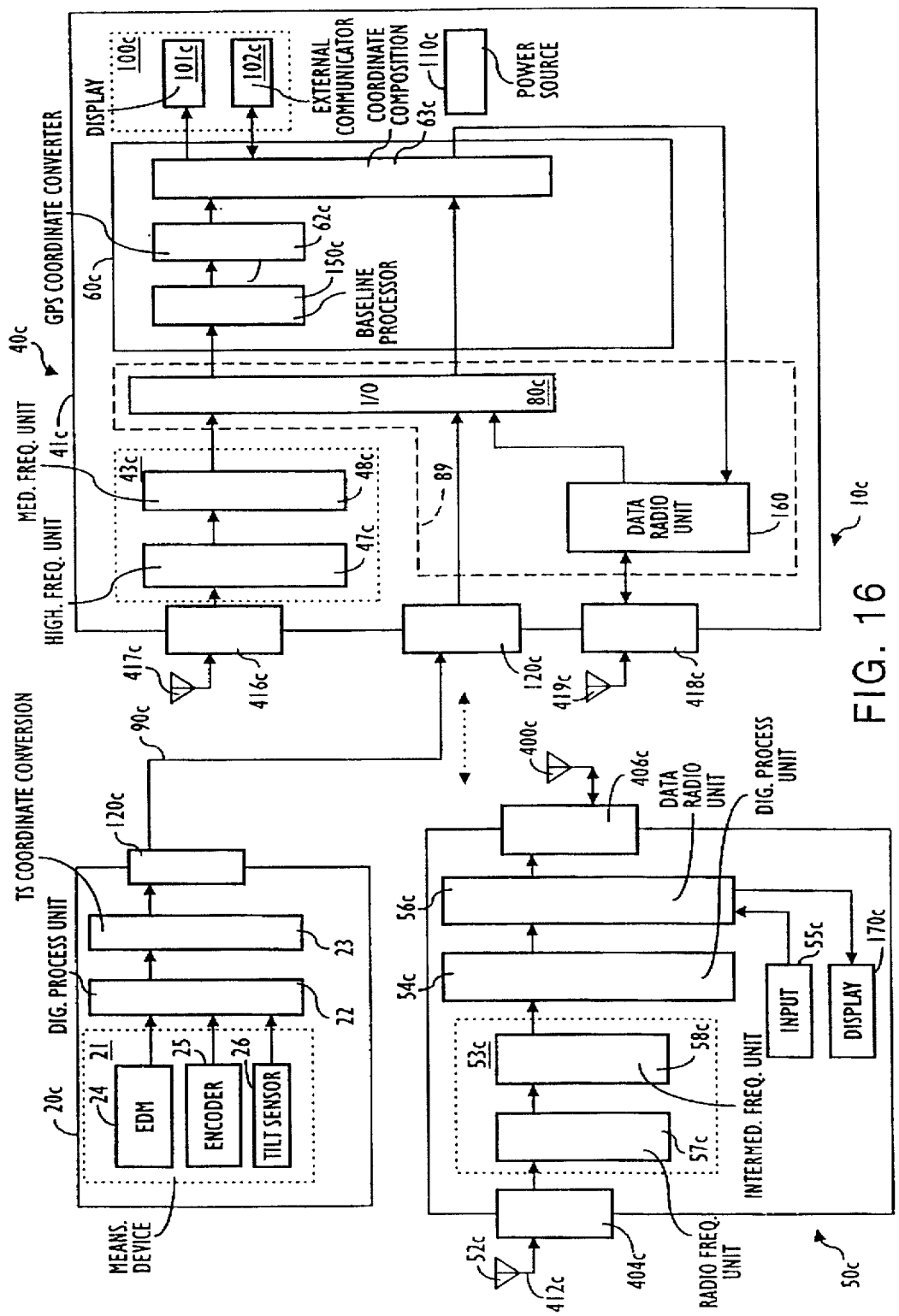
FIG. 16 is a block diagram of a survey system according to a fourth embodiment of the present invention.

FIG. 16 shows a block diagram of a survey system 10c according to a fourth embodiment of the present invention. Similar symbols are used for parts similar to those illustrated in connection with the first embodiment shown in FIG. 2. The illustrated survey system 10c generally includes a total station main body 20c, a reference station GPS survey apparatus 40c, and a measuring station GPS survey apparatus 50c.

Total station main body 20c is significantly simplified in comparison to total station main body 20 as illustrated in FIG. 2. More specifically, it includes a measuring device 21 coupled to a digital process unit 22 and an TS coordinate converter 23. TS coordinate converter 23 converts data to a coordinate value (referred to as an TS coordinate value). Measuring device 21 includes an EDM (Electric Distance Meter) 24, an encoder 25, and a tilt sensor 26. Digital process unit 22 converts values output by EDM 24, encoder 25, and tilt sensor 26 from analog to digital.

TS coordinate converter 23 converts digital values output by digital process unit 22 into an TS coordinate parameter (longitude $\phi$, latitude $\psi$, height h) of a Japanese geodetic system, a Bessel system, or a local system. The TS coordinate parameter is sent to reference station GPS survey apparatus 40c through light communication cable 90c. In the alternative, a copper or other type of conductive cable, wireless communication, or any other suitable form of communication may be used to transfer the information.

Reference station GPS survey apparatus 40c generally includes a GPS receiver 41c, a first antenna arrangement, a second antenna arrangement, and a connector portion 120c. The first antenna arrangement includes a GPS antenna 417c and an antenna interface 416c. The second antenna arrangement includes an antenna 419c and an antenna interface 418c.

GPS receiver 41c includes a front-end 43c, an input portion 89, a coordinate composite converter 60c, an output device 100c and a power source 110c. Front-end 43c is placed between the first antenna arrangement and input portion 89. Input portion 89 serves as an interface for transferring data in and out of reference station GPS survey apparatus 40c, including inputting total station data received from total station main body 20c and GPS data obtained by both the reference station and measuring station GPS survey apparatuses 40c and 50c.

Front-end 43c includes a radio frequency unit 47c and a intermediate frequency unit 48c. Input portion 89 includes an I/O 80c and a data radio unit 160.

Coordinate composite converter 60c includes a baseline processor 150c, a GPS coordinate converter 62c, and a coordinate composition device 63c.

Output device 100c is substantially identical to output device 100 provided in the embodiment illustrated in FIG. 2, and it includes a display 101c and an external communicator 102c.

Measuring station GPS survey apparatus 50c is similar to measuring station GPS survey apparatus 50 in the embodiment illustrated in FIG. 2, except that measuring station GPS survey apparatus 50c is further provided with a display 170c. Display 170c is substantially identical to display 170 which is provided in the embodiment shown in FIG. 14. More specifically, measuring station GPS survey apparatus 50c generally includes a GPS receiver 51 and a GPS antenna 52c connected to GPS receiver 51c through an antenna cable 412c and an antenna interface 404c. An additional antenna 400c is also connected to GPS receiver 51c through an antenna interface 406c. GPS receiver 51c includes a front-end 53c, a digital process unit 54c, a data radio unit 56c, an input key 55c, and a display 170c.

Front-end 53c includes a radio frequency unit 57c and an intermediate frequency unit 58c, and receives data from GPS antenna 52c. Digital process unit 54c converts data output from intermediate frequency unit 58c from analog to digital, and forwards the digital information to data radio unit 56c. Data radio unit 56c sends measurement station information (defined in more detail above, with respect to the first embodiment) to reference station GPS survey apparatus 40c via wireless communication using data radio unit 56c, antenna interface 406c, and antenna 400c. As was the case with the embodiment illustrated in FIG. 2, a single power source 110c may be provided which is shared by both total station main body 20c and reference station GPS survey apparatus 40c, except that in the embodiment of FIG. 16, the power source 110c is provided as part of reference station GPS survey apparatus 40c. The power may be transferred from reference station GPS survey apparatus 40c via connector 120c cable 90c, in a manner similar to that illustrated in FIG. 7 in connection with the first embodiment.

GPS composite converter 60c processes GPS values received by front-end 43c as well as GPS values forwarded from measuring station GPS survey apparatus 50, via wireless communication through antenna 419c, by performing a baseline process with baseline processor 150c. GPS coordinate converter 62c then converts information produced by baseline processor 150c into GPS coordinate values. Coordinate composition device 63c then composes the GPS coordinate value and the TS coordinate value (transmitted from total station main body 20c through cable 90c) to produce a parameter in compliance with a single coordinate system, i.e., a composed coordinate value of a single coordinate system, which may include a coordinate value (longitude φ, latitude ψ, height h) of the Japanese geodetic system, a Bessel system, or a local system.

The final composed coordinate value produced by reference station GPS survey apparatus 40c is transmitted to measuring station GPS survey apparatus 50c, and is displayed on display 170c. Accordingly, when driving a pole into a field, a surveyor may be able to immediately be notified of the coordinates, in real time. As with the second embodiment shown in FIG. 14, display 170c may comprise, for example, a liquid crystal display or a 7-segment display.

5. Fifth Embodiment

In accordance with a fifth embodiment of the present invention, the survey system 10c illustrated in FIG. 16 may be further modified by moving TS converter 23 into coordinate composite converter 60c, i.e., by placing a TS coordinate converter 23 between I/O 80c and the lower input of coordinate composition device 63c. Accordingly, since total station main body 20c is further without a TS coordinate converter 23, the structure of total station main body 20c is further simplified. Therefore, the size, weight, and cost of total station main body 20c may be further reduced.

In accordance with the above, survey results can be obtained and immediately displayed for use. In addition, the number of apparatuses that must be brought to a survey location and the time needed to input survey location and other date can be minimized. In addition, by connecting a total station main body to the measuring station GPS survey apparatus, data measured by the GPS survey apparatus can be used when inputting a reference coordinate value and the absolute direction of total station main body 20.

In addition, a baseline process may be performed by a baseline processor provided within a GPS survey apparatus. By providing this feature, the total station main body may be further simplified, reducing its size, weight, and cost. On the other hand, by eliminating a baseline processor from the GPS survey apparatus and placing the same into the total station main body, the GPS survey apparatus may be simplified, rendering the same, smaller, of less weight, and cost. In addition, other components normally provided within a total station main body may be moved to the GPS survey apparatus, so that total station main body is simplified.

A further feature of the present invention is the provision of digital data communications between the total station main body and each of the GPS survey apparatuses. This allows important data to be communicated and utilized, (e.g., displayed to a surveyor) in real time. By using a light communication cable (i.e., a fiber optic cable) to perform digital data communication between a total station main body and a GPS survey apparatus, fast communications can be achieved and signal interference can be avoided.

GPS survey apparatuses typically rely upon the reception of weak signals from a satellite, and are, therefore, sensitive to noise. By providing a light communication cable, such noise can be decreased and signal interference can be avoided. By performing wireless communication among GPS survey apparatuses and the total station main body, the number of components that must be carried to a survey location can be further decreased, since cables need not be carded. Eliminating cables eliminates other problems associated with cables, such as tangling and obstructions to measuring.

Another helpful feature is the sharing of the power source to provide power to a total station main body and one or more GPS survey apparatuses. This allows a reduction in the size and weight of each of the components of the survey system, and allows a reduction in the cost of providing power sources.

In certain embodiments, a display is provided in the measuring station GPS survey apparatus. This allows the surveyor to view coordinate information while at the survey site, and thus allows the surveyor to know the precise location at which a pole of the measuring station GPS survey apparatus is being placed.

While the invention has been described by way of example embodiments, it is understood that the words which have been used herein are words of description, rather than words of limitation. Changes may be made, within the purview of the appended claims, without departing from the scope and the spirit of the invention in its broader aspects. Although the invention has been described herein with reference to particular structures, components, means, materials, aid embodiments, it is understood that the invention is not limited to the particulars disclosed. The invention extends to all equivalent structures, components, means, and uses such as are properly within the scope of the appended claims.

What we claim is:

1. A survey system utilizing a global positioning system, comprising:
    a total station main body for surveying; and
    a plurality of GPS survey apparatuses including at least a reference station and a measuring station, each obtaining GPS data;
    said total station main body comprising:
        input means for inputting GPS data obtained from each of said GPS survey apparatuses,
        a coordinate composite converter which composes a composite coordinate value of a single coordinate system from the GPS data inputted by said input means and from total station data measured by said total station, and
        output means for outputting the composite coordinate value composed by said coordinate composite converter.

2. The survey system claimed in claim 1, further comprising a connector between said total station and one of said plurality of GPS survey apparatuses said connector detachably connecting said total station to one of said plurality of GPS survey apparatus.

3. A survey system utilizing a global positioning system, comprising:
    a plurality of GPS survey apparatuses including at least a reference station and a measuring station, each obtaining GPS data, wherein said reference station comprises a baseline processor which converts a GPS value measured by said reference station and by said measuring station into a GPS coordinate value; and
    a total station main body for surveying, said total station main body comprising:
        input means for inputting GPS data obtained from each of said GPS survey apparatuses, wherein said input means inputs the GPS coordinate value converted by said baseline processor,
        a coordinate composite converter which composes a composite coordinate value of a single coordinate system from the GPS data inputted by said input means and from total station data measured by said total station, and
        output means for outputting the composite coordinate value composed by said coordinate composite converter.

4. The survey system claimed in claim 1, wherein said input means of said total station inputs a GPS value measured by said reference station and said measuring station.

5. A survey system utilizing a global positioning system, comprising:
    a plurality of GPS survey apparatuses including at least a reference station and a measuring station, each obtaining GPS data, wherein said reference station comprises:
        a baseline processor which converts a GPS value measured by said reference station and by said measuring station into a GPS coordinate value, and
        a GPS coordinate converter which further converts said GPS coordinate value into a GPS survey coordinate value; and
    a total station main body for surveying, said total station main body comprising:
        input means for inputting GPS data obtained from each of said GPS survey apparatuses, wherein said input means inputs the GPS survey coordinate value,
        a coordinate composite converter which composes a composite coordinate value of a single coordinate system from the GPS data inputted by said input means and from total station data measured by said total station, and
        output means for outputting the composite coordinate value composed by said coordinate composite converter.

6. The survey system claimed in claim 1, wherein said input means of said total station inputs the GPS data by a digital data communication.

7. The survey system claimed in claim 6, further comprising a light communication cable for the digital data communication.

8. The survey system claimed in claim 6, further comprising a wireless communication means for the digital data communication.

9. The survey system claimed in claim 1, further comprising a power source unit shared by said total station and said reference station.

10. The survey system claimed in claim 1, wherein said measuring station comprises a display which displays/.he composite coordinate value outputted from said output means of said total station.

11. A survey system adopting a global positioning system, comprising:
    a total station for surveying;
    a plurality of GPS survey apparatuses including at least a reference station and a measuring station;
    said reference station being located at substantially the same position as said total station;
    said reference station comprising:
        input means for inputting total station data received from said total station and a GPS value measured by said reference station and by said measuring station,
        a baseline processor which processes with a baseline process the GPS value which is measured by said reference station and by said measuring station and inputted by said input means and outputs resultant data as GPS coordinate value,
        a coordinate composite converter which composes a coordinate value of a single coordinate system from the GPS coordinate value outputted from said baseline processor and the total station data inputted by said input means; and
        output means for outputting the coordinate value composed by said coordinate composite converter.

12. The survey system claimed in claim 11, further comprising a connector between said total station and said reference station, said connector detachably connecting said reference station to said total station.

13. The survey system claimed in claim 11, wherein
    said total station comprises total station coordinate converter which converts the total station value measured by said total station into a total station coordinate value; and
    said input means of said reference station inputs the total station coordinate value converted by said total station coordinate converter.

14. The survey system claimed in claim 11, wherein said input means of said reference station inputs a total station value measured by said total station.

15. The survey system claimed in claim 11, wherein said input means of said reference station inputs the total station data outputted from said total station by digital data communication.

16. The survey system claimed in claim 15, further comprising a light communication cable for the digital data communication.

17. The survey system claimed in claim 15, further comprising a wireless communication for the digital data communication.

18. The survey system claimed in claim 11, further comprising a power source unit shared by said total station and said reference station.

19. The survey system claimed in claim 11, wherein said measuring station has a display which displays the composed coordinate value outputted from said output means of said reference station.

20. A survey system adopting a global positioning system, comprising:

a total station including a total station main body and a pole equipped with a distance measurement prism; and a plurality of GPS measurement apparatuses, including at least a reference station and a measurement station; and wherein:

said pole is connected to said measurement station, said total station comprises a first memory, said plurality of GPS measurement apparatuses comprise a second memory, one of said first and said second memory stores a height and relative position of said distance measurement prism to a bottom of said pole, and said height and relative position are set as offsets in one of said first and said second memory before performing a survey.

21. A survey system claimed in claim 20, wherein said measurement station comprises:

an input key which inputs a prism height from a bottom of the pole at the measurement point to the distance measurement prism, antenna height from the bottom of the pole to the antenna of the GPS measurement apparatus for the measurement station, and a prism constant of the distance measurement prism; and a wireless communication unit which transmits the prism height, antenna height, and prism constant which are inputted by said input key, to either the total station main body or said measurement station.

* * * * *